United States Patent
Lee

(10) Patent No.: US 9,841,856 B2
(45) Date of Patent: Dec. 12, 2017

(54) TOUCH PANEL AND TOUCH DEVICE INCLUDING THE SAME

(71) Applicant: LG INNOTEK CO., LTD., Seoul (KR)

(72) Inventor: Tae Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 98 days.

(21) Appl. No.: 14/709,720

(22) Filed: May 12, 2015

(65) Prior Publication Data

US 2015/0331513 A1 Nov. 19, 2015

(30) Foreign Application Priority Data

May 14, 2014 (KR) .................. 10-2014-0058080

(51) Int. Cl.
*G09G 5/00* (2006.01)
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC .......... G06F 3/044; G06F 2203/04103; G06F 2203/04112
USPC .............. 345/156–184; 178/18.06; 361/749; 349/12
See application file for complete search history.

(56) References Cited

U.S. PATENT DOCUMENTS

| 5,278,362 A * | 1/1994 | Ohashi ................... H01H 9/181 200/314 |
| 8,923,014 B2 * | 12/2014 | Kim ...................... G06F 3/0418 345/173 |
| 2005/0179668 A1 * | 8/2005 | Edwards ................ G06F 3/044 345/173 |
| 2009/0091551 A1 * | 4/2009 | Hotelling .............. G06F 3/0416 345/174 |
| 2009/0256817 A1 * | 10/2009 | Perlin ................... G06F 3/0233 345/174 |
| 2010/0007616 A1 * | 1/2010 | Jang ....................... G06F 3/0412 345/173 |
| 2010/0258360 A1 * | 10/2010 | Yilmaz .................. G06F 3/044 178/18.06 |
| 2011/0134056 A1 * | 6/2011 | Kim ...................... G06F 3/0412 345/173 |
| 2011/0227867 A1 * | 9/2011 | Ogawa ................... G06F 3/044 345/174 |

(Continued)

FOREIGN PATENT DOCUMENTS

KR 10-2013-0104512 A 9/2013
KR 10-2013-0108902 A 10/2013

*Primary Examiner* — Prabodh M Dharia
(74) *Attorney, Agent, or Firm* — Ked & Associates, LLP

(57) ABSTRACT

A touch panel may include a substrate including a sensing area and a connecting area, a circuit pattern integrally formed on the substrate, and a driving chip on the connecting area of the substrate. The circuit pattern may include a sensing circuit pattern in the sensing area and a connecting circuit pattern in the connecting area. A width of the sensing area measured may be greater than a width of the connection area and the circuit pattern may extend from the sensing area to the connecting area. Moreover, the substrate may be a flexible substrate having a flexible characteristic.

20 Claims, 5 Drawing Sheets

(56) References Cited

U.S. PATENT DOCUMENTS

| | | | |
|---|---|---|---|
| 2011/0242021 A1* | 10/2011 | Jun | G06F 3/044 345/173 |
| 2012/0105344 A1* | 5/2012 | Ko | G06F 3/044 345/173 |
| 2012/0120003 A1* | 5/2012 | Lee | B32B 38/0004 345/173 |
| 2012/0127113 A1* | 5/2012 | Yau | G06F 3/045 345/174 |
| 2012/0306777 A1* | 12/2012 | Kang | G06F 3/044 345/173 |
| 2013/0069901 A1* | 3/2013 | Lee | G06F 3/041 345/173 |
| 2013/0093681 A1* | 4/2013 | Hsu | H03K 17/9622 345/168 |
| 2013/0162570 A1* | 6/2013 | Shin | G06F 3/041 345/173 |
| 2013/0162595 A1* | 6/2013 | Lee | G06F 3/0418 345/174 |
| 2013/0241868 A1 | 9/2013 | Kim et al. | |
| 2013/0271388 A1* | 10/2013 | Chu | G06F 3/0412 345/173 |
| 2014/0043569 A1* | 2/2014 | Yabuta | G02F 1/13338 349/104 |
| 2014/0111953 A1* | 4/2014 | McClure | G06F 3/044 361/749 |
| 2014/0253459 A1* | 9/2014 | Koo | G06F 3/0416 345/173 |
| 2014/0267989 A1* | 9/2014 | Kondo | G02F 1/133308 349/110 |
| 2014/0284527 A1* | 9/2014 | Lin | C09J 9/02 252/514 |
| 2014/0285465 A1* | 9/2014 | Hayashi | G06F 3/044 345/174 |
| 2014/0293153 A1* | 10/2014 | Wang | G06F 3/044 349/12 |
| 2014/0327649 A1* | 11/2014 | Lee | G06F 3/044 345/174 |
| 2014/0333556 A1* | 11/2014 | Lin | G06F 3/041 345/173 |
| 2015/0009179 A1* | 1/2015 | Kim | G06F 3/044 345/174 |
| 2015/0009623 A1* | 1/2015 | Ryu | G06F 3/046 361/679.55 |
| 2015/0077384 A1* | 3/2015 | Hong | G06F 3/044 345/174 |
| 2015/0234495 A1* | 8/2015 | Lo | G06F 3/0416 345/174 |
| 2015/0241906 A1* | 8/2015 | Tsai | G06F 3/044 345/173 |
| 2015/0268772 A1* | 9/2015 | Hotelling | G06F 3/0416 345/174 |
| 2015/0277605 A1* | 10/2015 | An | G06F 3/044 345/173 |
| 2015/0286325 A1* | 10/2015 | Kim | G06F 3/044 345/174 |
| 2016/0026288 A1* | 1/2016 | Zhan | G02F 1/13338 345/174 |
| 2016/0179234 A1* | 6/2016 | Dan | G06F 3/041 345/174 |
| 2016/0328036 A1* | 11/2016 | Lee | G06F 3/044 |

* cited by examiner

TOUCH PANEL AND TOUCH DEVICE INCLUDING THE SAME

CROSS-REFERENCE TO RELATED APPLICATION

This application claims priority under 35 U.S.C. §119 to Korean Application No. 10-2014-0058080 filed on May 14, 2014, whose entire disclosure is incorporated herein by reference.

BACKGROUND

1. Field

The disclosure relates to a touch panel and a touch device including the same.

2. Background

Recently, a touch panel, which performs an input function through the touch of an image displayed on a touch device by an input device such as a finger or stylus, has been applied to various electronic appliances.

The touch panel may be representatively classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation of capacitance when a finger of the user is touched on the capacitive touch panel between electrodes. When taking into consideration the convenience of a fabrication scheme and a sensing power, the capacitive touch panel has been spotlighted in a smaller model touch panel recently.

Meanwhile, a circuit board is separately provided to apply a signal to the touch panel. In this case, a bonding process is required to bond the touch panel to the circuit board, which makes a fabrication process complicated. In other words, the accurate alignment of the touch panel and the circuit board is required in the bonding process, which makes the bonding process significantly difficult. Meanwhile, when the touch panel is applied to a flexible touch device, a bonding part between the circuit board and the touch panel may be cracked as the flexible touch device is curved or bent.

BRIEF DESCRIPTION OF THE DRAWINGS

The embodiments will be described in detail with reference to the following drawings in which like reference numerals refer to like elements wherein.

DETAILED DESCRIPTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

In addition, when a predetermined part "is connected to" another part, this refers to not only that the predetermined part is directly connected to another part, but also that the predetermined is indirectly connected to another part while interposing another component between the predetermined part and another part. In addition, when a predetermined part "includes" a predetermined component, the predetermined part does not exclude other components, but may further include other components unless indicated otherwise.

Hereinafter, the embodiment will be described in detail with reference to accompanying drawings.

Figure 1:
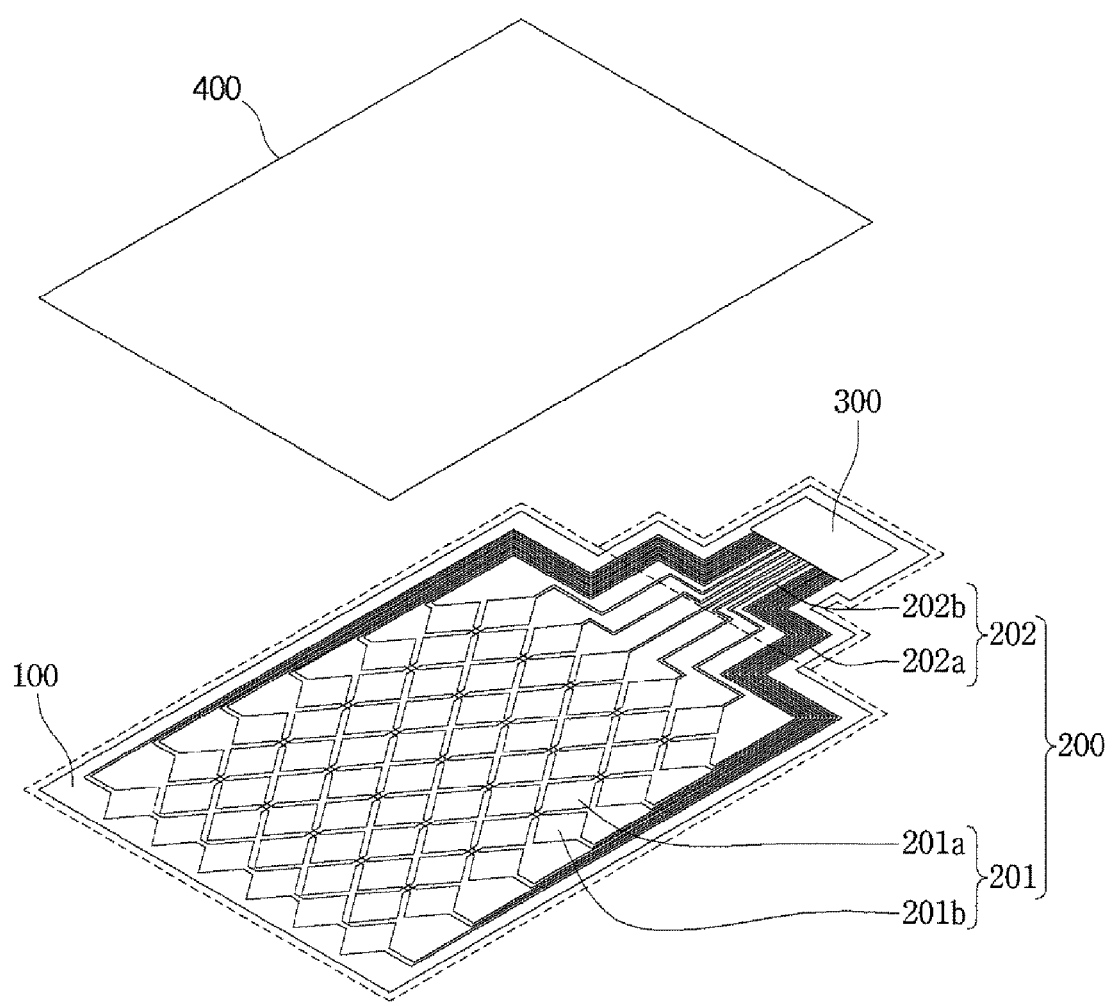
FIG. 1 is a perspective view showing a touch panel according to the embodiment.

Referring to FIG. 1, a touch panel 10 according to the embodiment may include a substrate 100, a circuit pattern 200, a driving chip 300, and a cover substrate 400.

The substrate 100 may support the circuit pattern 200 and the driving chip 300.

The substrate 100 may include a plastic film. For example, the substrate 100 may include a film including poly (ethylene terephthalate) (PET), polycarbonate (PC), polycarbonate, or polyimide. The substrate 100 includes the plastic film, so that the touch panel according to the embodiment can be flexibly realized, but the embodiment is not limited thereto. The substrate 100 may include various materials sufficient to support the circuit pattern 200 and the driving chip 300.

The substrate 100 may be rigid or flexible. For example, the substrate 100 may include glass or plastic.

In detail, the substrate 100 may include chemically tempered glass such as soda lime glass or aluminosilicate glass, or reinforced/flexible plastic such as polyimide (PI), polyethylene terephthalate (PET), propylene glycol (PPG) or poly carbonate (PC), or sapphire.

In addition, the substrate 100 may include an optical isotropic film. For example, the substrate 100 may include cyclic olefin copolymer (COC), cyclic olefin polymer (COP), an optical isotropic polycarbonate (PC), or optical isotropic polymethylmethacrylate (PMMA).

The sapphire has superior electric characteristics, such as permittivity, so that a touch response speed may be remarkably increased and a space touch, such as hovering, may be easily implemented. The sapphire has high surface hardness, so the sapphire may be used for a cover substrate. The hovering signifies a technique of recognizing coordinates even at a short distance from a display.

In addition, the substrate 100 may be bendable to have a partial curved surface. In other words, the substrate 100 is bendable such that a portion of the substrate has a flat surface and another portion of the substrate has a curved surface. In detail, an end portion of the substrate 100 may be bent with a curved surface or may be curved or bent with a surface having a random curvature.

In addition, the substrate 100 may be a flexible substrate having a flexible characteristic.

Further, the substrate 100 may include a curved or bended substrate. In this case, the touch panel including the substrate may have flexible, curved or bended characteristics. Accordingly, the touch panel according to the embodiment can be easily carried and variously designed.

Figure 2:
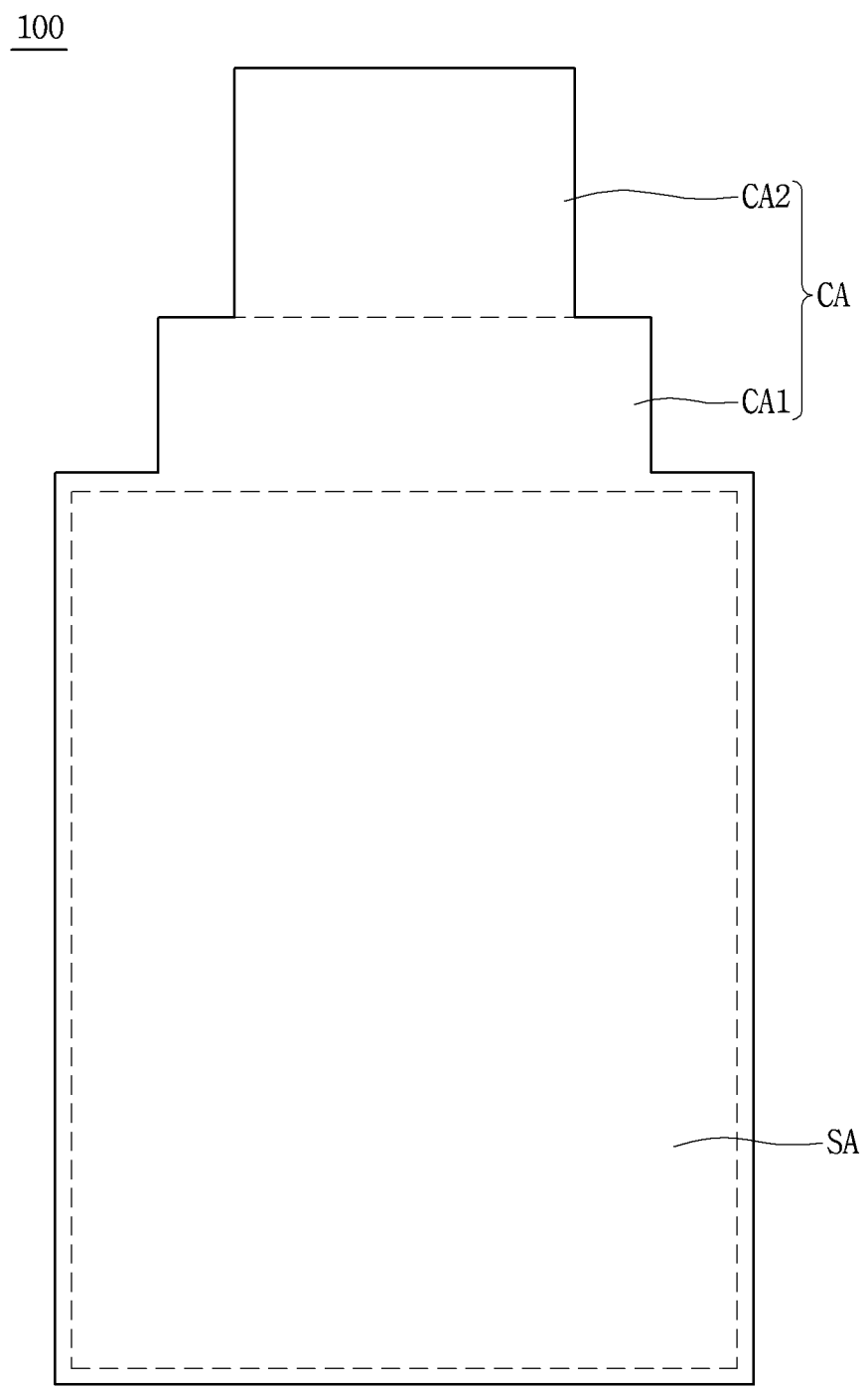
FIG. 2 is a plan view showing a touch panel according to another embodiment.

Referring to FIG. 2, the substrate 100 may include a sensing area SA and a connecting area CA. A touch may be sensed in the sensing area SA. In other words, when an input device, such as a finger or a stylus pen, touches the sensing area SA, the capacitance variation occurs in the touched part by the input device, and a part having the capacitance variation may be detected as a touch point.

In addition, the connecting area CA may apply a signal to the sensing area SA, but the embodiment is not limited thereto. In detail, the connecting area CA may apply the signal to the sensing area SA while detecting the touch.

The connecting area CA may include a first connecting area CA1 and a second connecting area CA2. In detail, the connecting area CA may include the first connecting area CA1 provided therein with the circuit pattern 200 and the second connecting area CA2 provided therein with the driving chip 300.

The first connecting area CA1 may be provided adjacent to the sensing area SA. In addition, the second connecting area CA2 may be provided adjacent to the first connecting area CA1. In other words, the sensing area SA and the second connecting area CA2 may be connected with each other by the first connecting area CA1.

The circuit pattern 200 may be provided on the substrate 100. The circuit pattern 200 may be provided on the sensing area SA and the connecting area CA. In other words, the circuit pattern 200 may be provided on the sensing area SA and the first connecting area CA1.

The circuit pattern 200 may extend from the sensing area SA to the connecting area CA. In other words, the circuit pattern 200 may extend from the sensing area SA to the first connecting area CA1.

The circuit pattern 200 may include a sensing circuit pattern 201 and a connecting circuit pattern 202.

The sensing circuit pattern 201 may be provided in the sensing area SA. The sensing circuit pattern 201 may sense the touch point.

The sensing circuit pattern 201 may include a first sensing circuit pattern 201a and a second sensing circuit pattern 201b. In detail, the sensing circuit pattern 201 may include the first sensing circuit pattern 201a extending in one direction and a second sensing circuit pattern 201b extending in a direction different from the one direction.

The connecting circuit pattern 202 may be provided in the first connecting area CA. In other words, the connecting circuit pattern 202 may be provided in the first connecting area CA1.

The connecting circuit pattern 202 may include a first connecting circuit pattern 202a and a second connecting circuit pattern 202b. In detail, the connecting circuit pattern 202 may include the first connecting circuit pattern 202a connected with the first sensing circuit pattern 201a and the second connecting circuit pattern 202b connected with the second sensing circuit pattern 201b.

The connecting circuit pattern 202 may apply an electrical signal to the sensing circuit pattern 201. In addition, the connecting circuit pattern 202 may extend from the sensing circuit pattern 201. In other words, the circuit pattern 200 may extend from the sensing area SA to the first connecting area CA1.

The circuit pattern 200 may include a conductive material.

The circuit pattern 200 may include a transparent conductive material allow electricity to flow without the blocking of the light transmission. For example, the circuit pattern 200 may include metal oxide such as indium tin oxide (ITO), indium zinc oxide (IZO), copper oxide, tin oxide, zinc oxide, or titanium oxide.

In addition, the circuit pattern 200 may include a nanowire, a photosensitive nanowire film, carbon nanotube (CNT), graphene, conductive polymer or the mixture thereof.

When a nanocomposite, such as a nanowire or a carbon nanotube, is used, the circuit pattern 200 may be configured in black color, and the content of nanopowders is adjusted to ensure electrical conductivity while controlling color and reflectance.

In addition, the circuit pattern 200 may include various metals. For example, the circuit pattern 200 may include at least one of chromium (Cr), nickel (Ni), copper (Cu), aluminum (Al), silver (Ag), molybdenum (Mo), gold (Au), titanium (Ti), and the alloy thereof.

The sensing circuit pattern 201 and the connecting circuit pattern 202 may include the same material. Accordingly, the sensing circuit pattern 201 and the connecting circuit pattern 202 may be formed through the same process. Accordingly, the process time can be reduced, and the fabrication process can be simplified.

However, the embodiment is not limited thereto, but the sensing circuit pattern 201 and the connecting circuit pattern 202 may include mutually different materials. For example, the sensing circuit pattern 201 may include a transparent material. In other words, the sensing circuit pattern 201 may include a material representing high transmittance. For example, the sensing circuit pattern 201 may include metal oxide such as indium tin oxide (ITO), indium zinc oxide (IZO), copper oxide, tin oxide, zinc oxide, or titanium oxide described above. In addition, the sensing circuit pattern 201 may include a nanowire, a photosensitive nanowire film, carbon nanotube (CNT), graphene, or conductive polymer.

Alternatively, the connecting circuit pattern 202 may include an opaque material. For example, the connecting circuit pattern 202 may include various metals described above. In other words, the connecting circuit pattern 202 may include at least one of chromium (Cr), nickel (Ni), copper (Cu), aluminum (Al), silver (Ag), molybdenum (Mo), gold (Au), titanium (Ti), and the alloy thereof.

Accordingly, the transparent sensing area SA can be ensured, and the application to various touch devices are possible.

Figure 3:
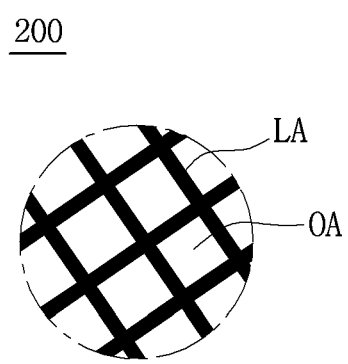
FIG. 3 is a plan view showing a substrate according to the embodiment.

The circuit pattern 200 may include a conductive pattern. For example, referring to FIG. 3, the circuit pattern 200 may include a mesh structure. In this case, the mesh shape may be formed in random to prevent a moiré phenomenon. The moiré phenomenon occurs when periodical stripes overlap with each other. Since adjacent stripes overlap with each other, a thickness of a stripe is thickened so that the stripe is spotlighted as compared with other stripes. Thus, in order to prevent such a moiré phenomenon, the conductive pattern may be provided in various shapes.

In this case, the conductive pattern may have a regular shape. In other words, the conductive pattern may include a line part LA and an opening part OA.

In this case, a line width of the line part LA may be in the range of about 0.1 μm to about 10 μm. The line part LA having a line width less than about 0.1 μm may not be formed due to the characteristic of the manufacturing process, or may cause the short of the mesh line. If the line part LA has the line width exceeding about 10 μm, the line part LA may be viewed from the outside so the visibility may be deteriorated. Preferably, the line width of the line part LA may be in the range of about 0.5 μm to about 7 μm. More preferably, the line width of the line part LA may be in the range of about 1 μm to about 3.5 μm.

The opening part OA may have various shapes. For example, the opening part OA may have various shapes such as a polygonal shape including a rectangular shape, a diamond shape, a pentagonal shape or a hexagonal shape, or a circular shape. In addition, the opening part OA may have a regular shape or a random shape.

The circuit pattern 200 has the mesh shape, so that the circuit pattern may not be viewed on a display area. In other words, even if the circuit pattern includes metal, the circuit pattern may not be viewed. In addition, even if the circuit pattern is applied to a large-sized touch window, the resistance of the touch window may be lowered.

The driving chip 300 may be provided on the substrate 100. For example, the driving chip 300 may be provided in the connecting area CA. In detail, the driving chip 300 may be mounted on the second connecting area CA. The circuit pattern 200 and the driving chip 300 may be provided on the same surface of the substrate 100. In other words, the circuit pattern 200 and the driving chip 300 may be provided on the same substrate 100.

The circuit pattern 200 may be electrically connected with the driving chip 300. In detail, the sensing circuit pattern 201 may be electrically connected with the driving chip 300 by the connecting circuit pattern 202. In other words, one end of the connecting circuit pattern 202 may be connected with the sensing circuit pattern 201, and an opposite end to the one end may be connected with the driving chip 300. In addition, the connecting circuit pattern 202 may be directly connected with the driving chip 300.

Accordingly, a touch signal generated from the sensing circuit pattern 201 is sent to the driving chip 300 through the connecting circuit pattern 202, so that a touch operation can be performed.

Thereafter, the cover substrate 400 may be provided on the substrate 100. The cover substrate 400 may be bonded to the substrate 100. In detail, the cover substrate 100 may be bonded to the substrate 100 by a transparent adhesive material such as an optical clear adhesive (OCA) or an optical clear resin (OCR).

The cover substrate 400 is provided on the substrate 100, the circuit pattern 200, and the driving chip 300, thereby protecting the substrate 100, the circuit pattern 200, and the driving chip 300 from an external impact, and preventing foreign matters from being introduced into the substrate 100, the circuit pattern 200, and the driving chip 300. The cover substrate 400 may include a material the same as or similar to that of the substrate 100.

According to the embodiment, the circuit pattern 200 and the driving chip 300 are provided on the same substrate 100, so that the touch panel having a simple structure can be ensured. In other words, a touch panel integrated with a circuit board (or a circuit board integrated with the touch panel) can be realized. According to the related art, the circuit board is separately provided, so that a bonding process between the touch panel and the circuit board is additionally required. However, according to the embodiment, the bonding process can be omitted. Accordingly, the process time can be reduced and the process cost can be saved.

In addition, when the touch panel according to the embodiment is applied to the flexible touch device, the reliability of the flexible touch device can be improved. In other words, when the touch panel is bonded to the circuit board, the bonding part may be weak against the bonding or the curving. However, according to the embodiment, the bonding part is omitted, so that the touch panel can be prevented from being cracked due to the bonding or the curving.

In addition, when the touch panel according to the embodiment is applied to the flexible touch device, the circuit pattern can be realized on one substrate including a display area and a non-display area. Accordingly, it is unnecessary to separately realize the touch in the display area and the touch in the non-display area.

In other words, the touch in the display area and the touch in the non-display area can be realized once. Accordingly, the process time can be reduced, the process cost can be saved, and the degree of the freedom in the design of the touch panel can be improved, so that the convenience can be provided to a user.

Figure 4:
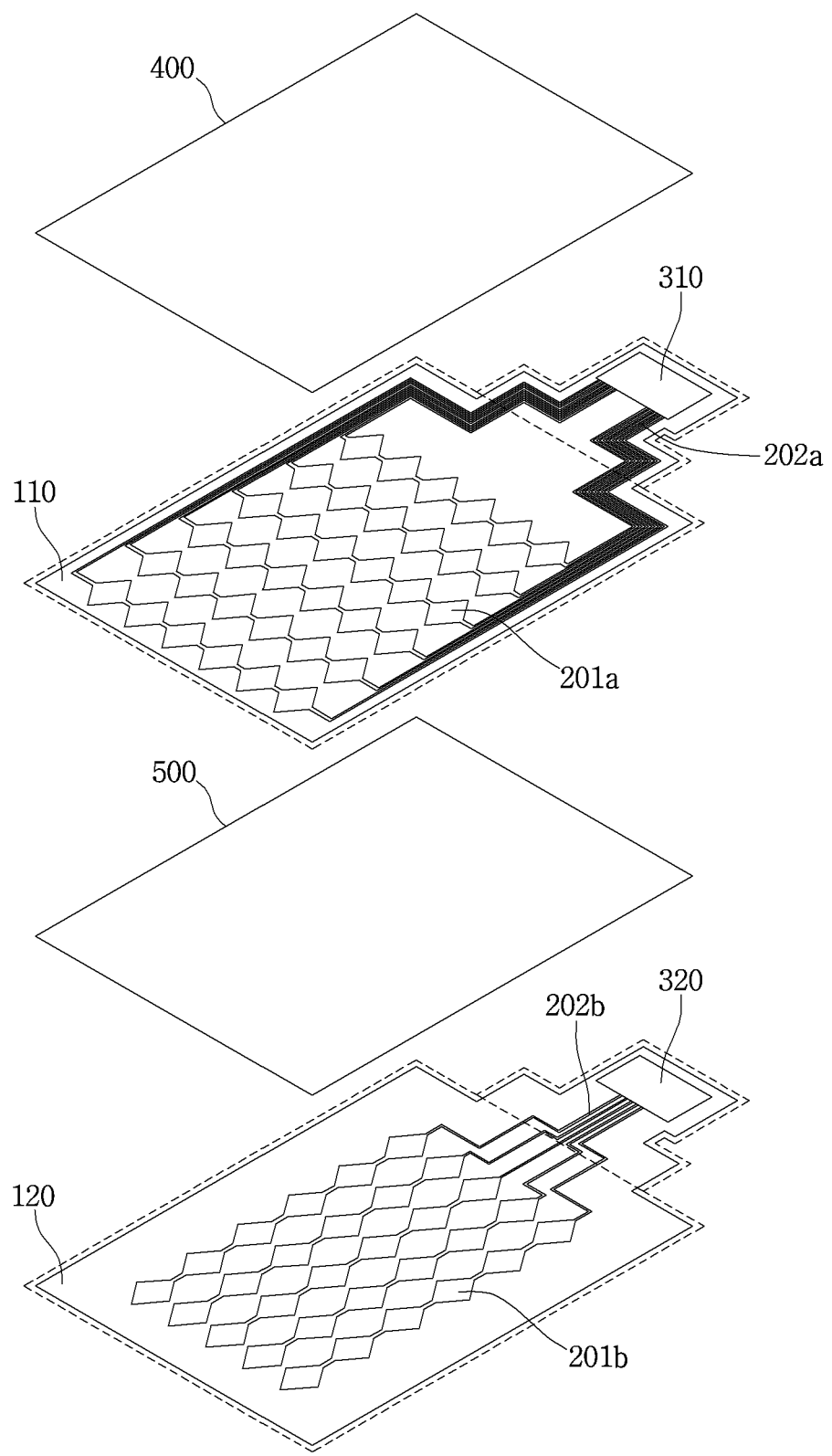
FIG. 4 is a perspective view showing a conductive pattern shape of the circuit pattern according to the embodiment.

Referring to FIG. 4, circuit patterns 200 extending in directions different from each other may be provided on mutually different substrate 100, respectively. In other words, the substrate 100 may include a first substrate 110, and a second substrate 120 on the first substrate 110.

In detail, the first sensing circuit pattern 201a and the first connecting circuit pattern 202a may be provided on the first substrate 110. The first connecting circuit pattern 202 may be directly connected with a first driving chip 310 on the first substrate 110.

In addition, the second sensing circuit pattern 201b and the second connecting circuit pattern 202b may be provided on the second substrate 120. The second connecting circuit pattern 202b may be directly connected with a second driving chip 320 on the second substrate 120.

The cover substrate 400, the first substrate 110, and the second substrate 120 may be bonded to each other through the transparent adhesive material described above.

Figure 5:
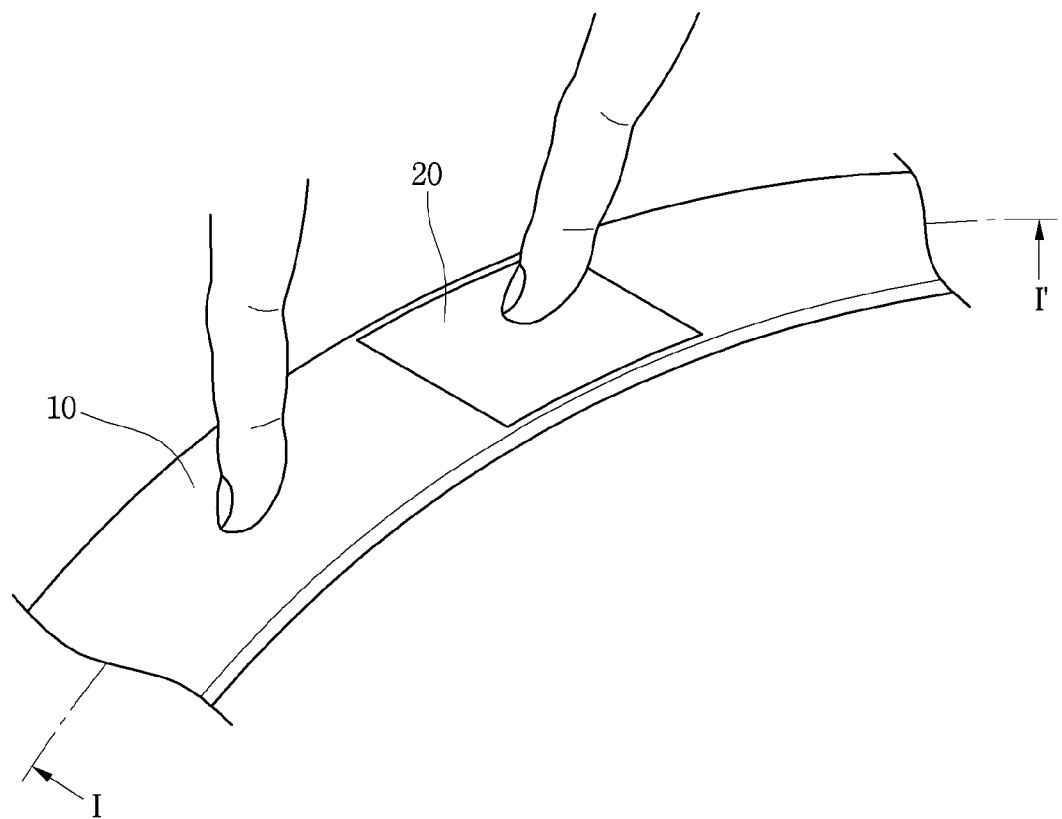
FIG. 5 is a perspective view showing the touch device according to the embodiment.
Figure 6:
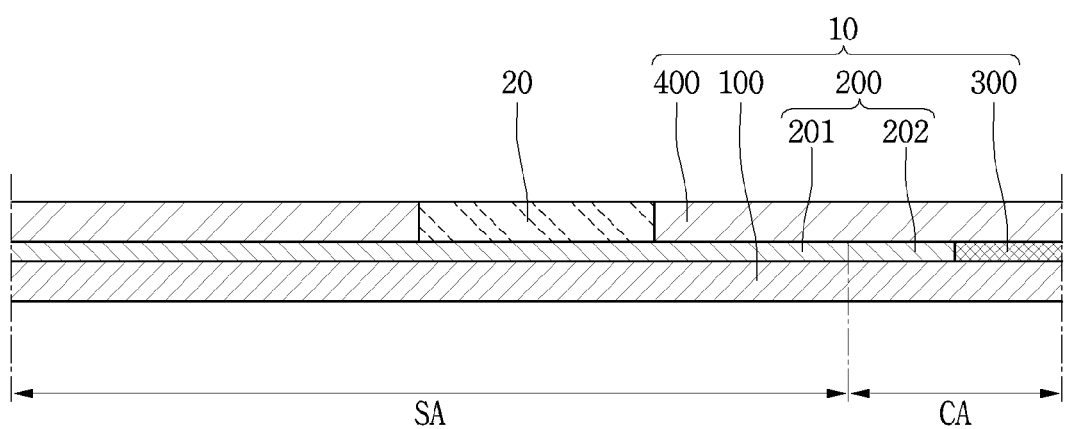
FIG. 6 is a sectional view taken along line I-I' of FIG. 5.

In addition, the touch panel 10 according to the embodiment may be combined with a display 20 to configure a touch device. For example, as shown in FIGS. 5 and 6, the touch device may include a wearable touch device. In detail, the touch device may be a clock.

In this case, the cover substrate 20 for display may be provided instead of the cover substrate 400. The cover substrate 20 for the display may be provided on the sensing area SA of the touch panel 10. The cover substrate 400 may be provided except for an area for the cover substrate 20 for the display. Accordingly, the area of the substrate 100 may be wider than the area of the cover substrate 400.

In addition, the area of the substrate 100 may be wider than that of the cover substrate 20 for the display.

In addition, a display may be provided under the cover substrate for the display.

The wearable touch device can sense touch at a peripheral portion of the display as well as the display.

Accordingly, various touch use environments and the convenience in the living can be provided to a user.

In this case, the cover substrate for the display may be transparent, and the cover substrate 400 may be opaque. Accordingly, the degree of freedom in the design of the touch device can be improved.

In other words, a touch can be sensed even in a band to be put on the wrist of a user, so that a touch area can be enlarged.

In addition, the embodiment is not limited thereto, but the touch device may be applied to various devices, such as clothes, gloves, shoes, hats, and glasses, which can be put on by a user. In addition, the touch device can be applied to various electronic products such as a mobile terminal, a vehicle navigation system, and a vehicle touch device.

The embodiment provides a touch panel having improved reliability and a touch device including the same.

According to the embodiment, there is provided a touch panel including a substrate including a sensing area and a connecting area, a circuit pattern provided on the substrate, and a driving chip provided on the substrate.

As described above, according to the embodiment, the circuit pattern and the driving chip are provided on the same substrate, so that the touch panel having a simple structure can be ensured. In other words, a touch panel integrated with a circuit board (or a circuit board integrated with the touch panel) can be realized. According to the related art, the circuit board is separately provided, so that a bonding process between the touch panel and the circuit board is additionally required. However, according to the embodiment, the bonding process can be omitted. Accordingly, the process time can be reduced and the process cost can be saved. In addition, when the touch panel is applied to the flexible touch device, the reliability of the flexible touch device can be improved. In other words, when the touch panel is bonded to the circuit board, the bonding part may be weak against the bonding or the curving. However, according to the embodiment, the bonding part is omitted, so that the touch panel can be prevented from being cracked due to the bonding or the curving.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a substrate comprising a sensing area and a connecting area;
a circuit pattern formed on the substrate; and
a driving chip on the connecting area of the substrate,
wherein the sensing area and the connecting area are provided on a same surface of the substrate,
wherein the connection area extends from one edge of the substrate and a width of the connection area is smaller than a width of the sensing area,
wherein the circuit pattern comprises:
a sensing circuit pattern in the sensing area; and
a connecting circuit pattern in the connecting area,
wherein the circuit pattern extends from the sensing area to the connecting area, and wherein the connecting circuit pattern is integrally formed with the sensing circuit pattern to extend from the sensing area to the connection area, tracing a distal side of the sensing area,
wherein the substrate is a flexible substrate including flexible plastic, and
wherein the circuit pattern and the driving chip are disposed on a same surface of the substrate.

2. The touch panel of claim 1, wherein the connecting area comprises:
a first connecting area adjacent to the sensing area; arid
a second connecting area adjacent to the first connecting area, and
wherein the connecting circuit pattern is provided on the first connecting area, and the driving chip is provided on the second connecting area.

3. The touch panel of claim 2, wherein the driving circuit is mounted on the second connecting area.

4. The touch panel of claim 1, wherein the circuit pattern and the driving chip are provided on a same surface of the substrate.

5. The touch panel of claim 1, wherein the sensing circuit pattern, the connecting circuit pattern, and the driving chip are electrically connected with each other.

6. The touch panel of claim 5, wherein the connecting circuit pattern is directly connected with the driving chip.

7. The touch panel of claim 1, wherein one end of the connecting circuit pattern is connected with the sensing circuit pattern, and an opposite end to the one end is connected with the driving chip.

8. The touch panel of claim 1, wherein the sensing circuit pattern and the connecting circuit pattern include a same material.

9. The touch panel of claim 1, wherein the sensing circuit pattern includes a material different from a material of the connecting circuit pattern.

10. The touch panel of claim 9, wherein the sensing circuit pattern is transparent, and wherein the connecting circuit pattern includes an opaque material.

11. The touch panel of claim 1, wherein the sensing circuit pattern comprises a first sensing circuit pattern and a second sensing circuit pattern extending in mutually different directions.

12. The touch panel of claim 11, wherein at least one of the first and second sensing circuit patterns comprises a mesh-shaped pattern,
wherein the mesh-shaped pattern includes a line part and an opening part, and
wherein a line width of the line part is in the range of 0.1 μm to 10 μm.

13. The touch panel of claim 11, wherein the substrate comprises:
a first substrate on the cover substrate; and
a second substrate on the first substrate, and
wherein the first sensing circuit pattern is provided on the first substrate, and the second sensing circuit pattern is provided on the second substrate.

14. The touch panel of claim 1, further comprising a cover substrate on the substrate,
wherein the cover substrate includes a material the same as that of the substrate.

15. The touch panel of claim 14, wherein the substrate has an area wider than an area of the cover substrate,
wherein the sensing area overlaps with the cover substrate, and
wherein the connecting area is non-overlapping with the cover substrate.

16. A touch device comprising the touch panel according to claim 1; and a display on the touch panel.

17. The touch device of claim 16, further comprising a clock.

18. The touch device of claim 16, wherein the display is provided on the sensing area.

19. The touch device of claim 16, wherein a touch is sensed in the display and at a peripheral portion of the display.

20. The touch panel of clam 2, wherein a width of the first connection area measured in one direction of the substrate is larger than a width of the second connecting area.

\* \* \* \* \*